W. EGGERS.
ATTACHMENT FOR TROLLEY HARPS.
APPLICATION FILED NOV. 11, 1913.

1,118,847.

Patented Nov. 24, 1914.
2 SHEETS—SHEET 1.

Witnesses
J. L. Wright

Inventor
Walter Eggers
By Victor J. Evans
Attorney

W. EGGERS.
ATTACHMENT FOR TROLLEY HARPS.
APPLICATION FILED NOV. 11, 1913.
1,118,847.
Patented Nov. 24, 1914.
2 SHEETS—SHEET 2.
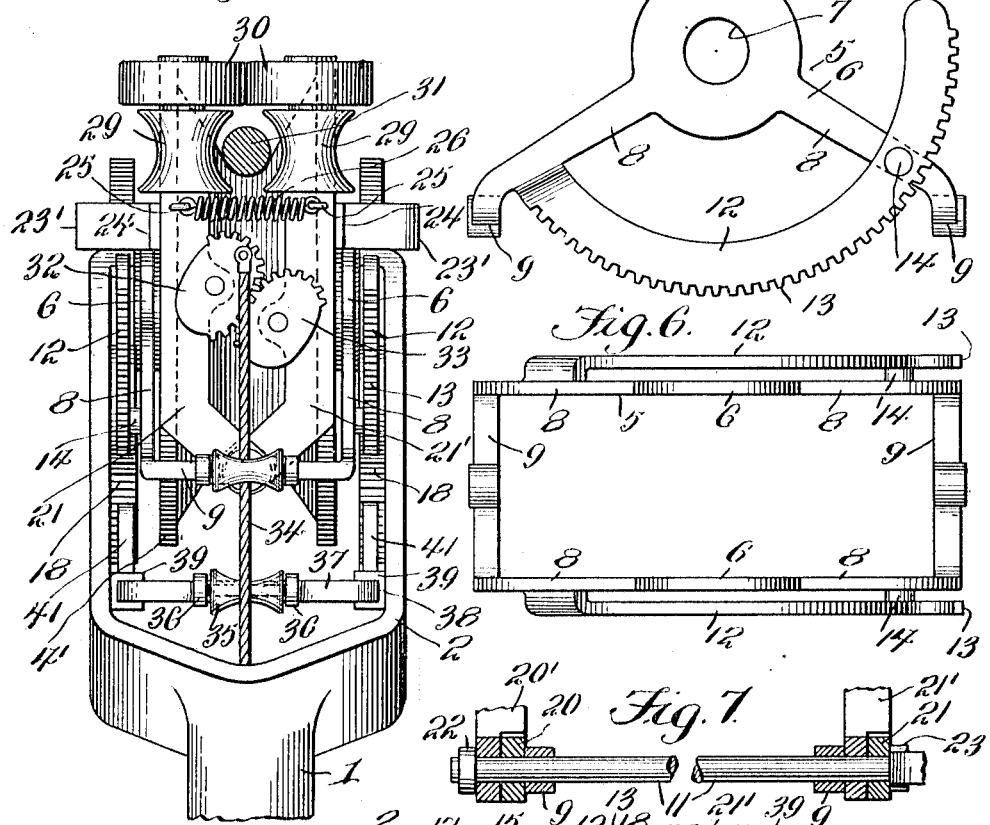

UNITED STATES PATENT OFFICE.

WALTER EGGERS, OF BALTIMORE, MARYLAND.

ATTACHMENT FOR TROLLEY-HARPS.

1,118,847. Specification of Letters Patent. Patented Nov. 24, 1914.

Application filed November 11, 1913. Serial No. 800,365.

*To all whom it may concern:*

Be it known that I, WALTER EGGERS, a citizen of the United States, residing at Baltimore, in the State of Maryland, have invented new and useful Improvements in Attachments for Trolley-Harps, of which the following is a specification.

The present invention relates to attachments for trolley harps.

In carrying out my invention it is my purpose to provide a trolley harp with simple but effective means for sustaining the feed wire within the grooved trolley wheel carried by the harp irrespective of curves or of undulating surfaces upon which the track for the trolley car is laid.

I also aim to provide an attachment of this class which may be supported wholly from the axle of the trolley wheel and which provides guard members arranged on the opposite sides as well as above the trolley wire to guide the said wire to within the groove of the trolley wheel, should the wheel attempt to jump the wire or should the wire attempt to leave the groove of the trolley wheel, owing to irregularities in the wire or to curves in the said wire, or from other causes.

A further object of the invention is the provision of a pivoted support for the attachment which will permit of a swinging movement of the said attachment to agree with irregularities in the feed wire or to compensate for the arrangement of the wire with relation to the undulating surfaces upon which the track is laid, and to provide the said swinging support with means whereby the same will be effectively locked to prevent any tilting or rotary movement of the attachment when the members of the said attachment are operated to be caused to swing one away from the other to permit of the trolley being lowered.

A still further object of the invention is the construction of a device of this character which shall embody the desirable features of simplicity in construction, comparative cheapness in manufacture and ease and accuracy in operation.

With the above and other objects in view, the invention resides in the construction, combination and arrangement of parts set forth in the following specification and falling within the scope of the appended claims.

Figure 1:
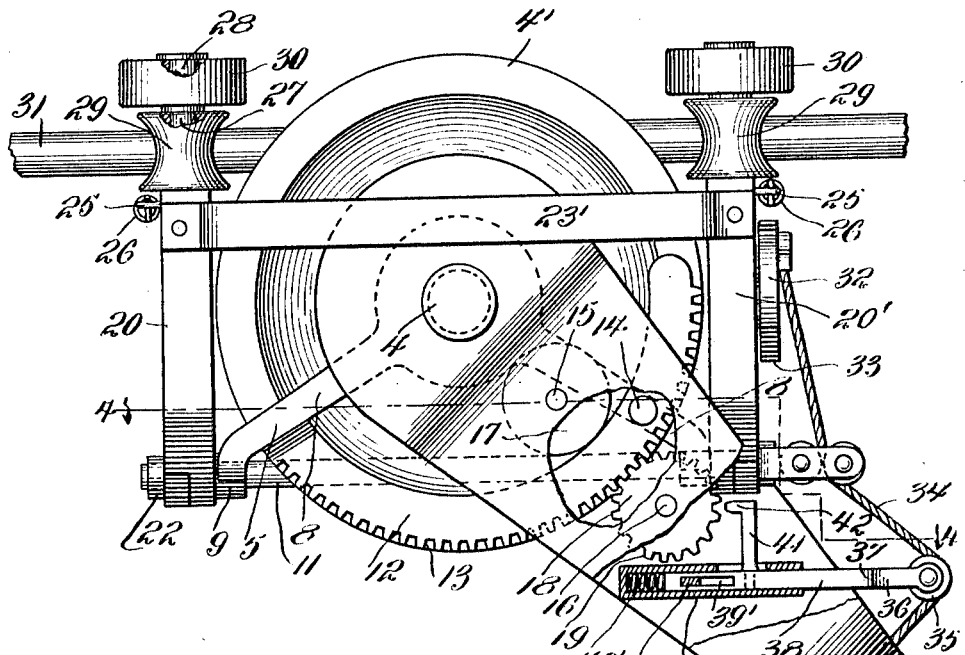
Figure 2:
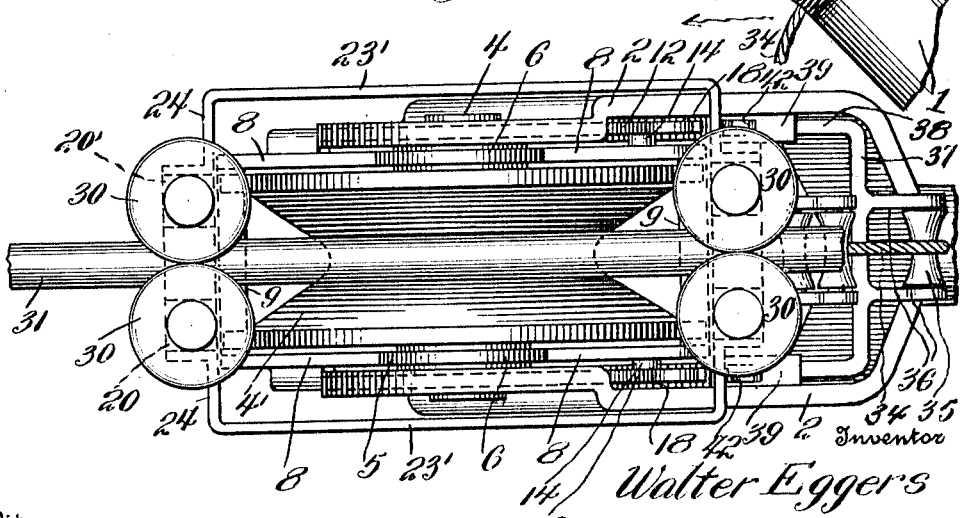

In the drawings: Figure 1 is a side elevation showing the improvement in applied position upon the harp of a trolley pole, Fig. 2 is a top plan view of the same, Fig. 3 is an end view of the same, Fig. 4 is a horizontal sectional view on the line 4—4 of Fig. 1, Fig. 5 is a side view of the supporting frame, Fig. 6 is a plan view of the frame, and Fig. 7 is a central longitudinal section taken with the plane of the shaft of the axle to which the side arms of the roller carrying members of the device and the arms of the support are attached.

Referring now to the drawings in detail, 1 designates a trolley pole, and 2 the harp which is formed upon the end of the pole. The arms of the harp have registering rounded openings for the reception of the axle or shaft 4 upon which is rotatably mounted the peripherally grooved trolley wheel 4'.

The numeral 5 designates the support for my improvement. The support includes spaced sides 6 which have registering openings 7, so that the said support may be swung upon the shaft or axle. The upper portion of each of the sides is preferably rounded and has depending therefrom angular arms 8, the said arms diverging in opposite directions and having their lower portions provided at their ends with transversely arranged connecting members 9, each of the said connecting members being centrally formed with a rounded enlargement which has an opening that is adapted to receive a longitudinally arranged shaft 11. The shaft extends a suitable distance beyond the ends of the connecting members 9 of the support 5, for a purpose which will presently be described. Preferably integrally formed with one of the arms 8 on each side of the support 5, and offset therefrom is a segmental member 12, the lower periphery of which is provided with teeth 13, but its upper peripheral edge is preferably smooth. The segmental member 12 is spaced away from the second arm 8 through the medium of a connecting member 14.

Journaled in suitable bearings upon the side arms of the harp 2 are the shafts 15 and 16 of wheels 17 and 18 respectively. The wheels 17 engage each with the upper edge of one of the segmental members 12, while the wheels 18 have peripheral teeth 19 that are adapted to engage with the teeth 13 of the said segmental members 12.

The numerals 20 and 20' indicate a pair of arms which are adapted to be arranged vertically to one side of the trolley wheel 4', while the numerals 21 and 21' indicate a similar pair of arms which are adapted to be arranged to the opposite side of the said trolley wheel. Both pairs of arms are of a similar construction, each having its lower end inclined inwardly, or toward each other, and as the pairs of arms are of a similar size, the lower and meeting portions of the inclined ends are cut vertically to provide reduced overlapping portions, the said overlapping portions having registering openings to receive the extending ends of the shaft 11, and the extreme ends of the shaft may be, and preferably are, provided with suitable means, such as enlarged heads 22 and 23 for sustaining the pairs of arms upon the said shaft.

The numerals 23' indicate longitudinally extending brace bars which have their ends inturned and provided with angular legs 24 that are secured, in any desired or preferred manner, to the adjacent pairs of arms 20 and 21, and 20' and 21', and the said arms and their connecting members provide what I will term the frame for the device. The arms 20 and 20', 21 and 21' have their outer faces adjacent their upper ends provided with eyes 25, the oppositely disposed pairs of eyes being each adapted to receive the end coils of a spring member 26. Each of the springs 26 is provided for swinging the upper ends of the respective pair of arms toward each other, and each of said pairs of arms, above the springs 26, is formed with a reduced rounded extension 27 and 28. Arranged for rotation upon the rounded extensions 27 are grooved rollers 29, and mounted for rotation upon the reduced rounded portions 28 are flat rollers 30, the same bearing upon the shoulders provided between the portions 27 and 28 of each of the arms, and the rollers 30 arranged upon the diametrically opposite pairs of arms are adapted to contact to limit the inward swinging movement of the said arms, as well as for preventing the trolley wheel 4' jumping the feed wire 31 by a downward movement of the said trolley wheel, while the grooved rollers 29 prevent a lateral movement of the trolley wheel with relation to the feed wire 31.

It will be noted that the device is suspended by the support 5 which is journaled upon the axle 4. Therefore, the frame is susceptible to a swinging movement upon the axle, and so the grooved wheels 29 and rollers 30 will travel upon the wire without regard to irregularities in the wire, and further, the trolley pole 1 being influenced by the ordinary springs employed for such purpose, in an upward direction, the frame of the device will be normally sustained in a horizontal position. The segmental member 12 engaged by the wheels 17 and 18 which are, as previously set forth, mounted upon axles or shafts upon the arms of the trolley wheel, will materially assist in sustaining the frame of the structure in the proper horizontal position, and the frictional engagement between the wheels 17 and 18 upon the opposite sides of the segmental member 12 is sufficient to normally prevent the swinging movement of the device, but the said frictional engagement is not sufficient to hold the frame against a swinging movement when its roller members 28 are contacted forcibly by the wire 31. It is, of course, necessary that means should be provided for swinging the arms of the frame outwardly from each other and upon the shaft 11. To accomplish this, I pivotally connect to the outer faces of each of the arms 21 and 21' an oval gear or co-acting toothed members 32 and 33. The gears are so arranged that when the rollers 28 are in contacting position, the said oval members will have the teeth upon their longer sides in engagement (see Fig. 3). I connect to the upper end of the oval gear 32 an operating cord or cable 34. The cable 34 is guided over a roller 35, and a pull upon the said cable will rotate the oval toothed member 32 which, meshing with the teeth of the oval member 33, will swing the frame of the device to an open position, to permit of the trolley wheel being brought below the feed wire 31.

As previously stated, the frame is permitted a swinging movement by its support 5, and the wheels 18 and 17 engaging with the segmental members 12 of the support 5 serve as guides in directing the said swinging movement of the frame. It is to be understood that the usual spring for the trolley pole, that is arranged adjacent its pivot with the car, and which, being well known, has not been deemed necessary to illustrate, exerts a tension to force the trolley pole to an upward position and its grooved wheel into contact with the feed wire 31. This movement of the trolley wheel 4', permits of the wheels 17 and 18, which co-act with the segmental members 12 of the support, to normally sustain the device in a horizontal position.

The wheels acting upon the segmental member, through the medium of the spring for the trolley pole may be considered centering elements for the frame of the device for sustaining the said frame in a horizontal position, as above stated, but it is necessary to lock the said frame against swinging movement when the wheel is lowered below the feed wire 31 and to accomplish this, I journal the roller 35 between a pair of arms 36 arranged upon the connecting member 37 of a substantially U-shaped locking member 38. The side arms of the U-shaped member 38 are arranged in suitable bearing sleeves 39 which are preferably provided upon the inner sides of the arms of the harp adjacent the toothed wheels 18. The sleeves 39 are provided with elongated slots through which pass pins 40, the said pins being secured to the portions of the arms of the locking member 38 received within the bearing sleeves 39, and I further arrange within the said sleeves 39, springs 40 which normally force the arms of the locking member 38 outwardly therefrom, the said movement being limited by the pins 40. Each of the longitudinal arms of the locking member 38 is provided with an upset portion or lug 41 which terminates in a longitudinally extending tooth 42, and it will be noted that when the cable 34 is forced toward the rear end of the car, or in the direction of the arrow (shown in Fig. 1), the first movement of the cable will be to slide the locking member 38 against the light springs 40′ to cause the teeth 42 to engage between two of the teeth of the wheels 18, thus locking the wheels 18 to prevent a rotary movement of the segmental members 12, and so sustaining the device in its normal horizontal position. A further pull upon the cable 34 will rotate the oval gear 32, which, having its teeth mesh with the teeth of the gear 33 will cause the side members of the frame to swing upon their pivotal connections with the shaft 11, thus spreading both the conical rollers 29 and the flat rollers 28 from each other so that the trolley pole and wheel may be lowered to swing the same to the opposite end of the car when the path of travel of the car is to be reversed, or for other reasons. The springs 40, as has been stated, are light and as long as any tension is retained upon the cable 34 the dogs or teeth 42 will be sustained in engagement with the teeth of the wheels 18 so that when the trolley is again arranged upon the wire, the frame of the device will be retained in its normal horizontal position.

Having thus described the invention, what I claim is:

1. A trolley having in combination a pole provided with a harp and an axle whose ends are in the sides of the harp, a support carried by the axle, a shaft secured to the support, a frame including end arms arranged in pairs and journaled upon the shaft, grooved rollers arranged opposite each other and journeled one upon each of the arms, flat contacting rollers arranged above the grooved rollers, spring members upon the opposite pairs of arms for forcing the flat rollers into contact, the flat rollers arranged above the said wire for the trolley wheel and the grooved rollers arranged in pairs to the opposite sides of the said feed wire, and means for swinging the arms of the frame to an open position to permit of the lowering of the trolley wheel from the feed wire.

2. A trolley having in combination, a pole provided with a harp, an axle in the harp and a trolley wheel upon the axle, a supporting member journaled upon the axle, a shaft connected with the support, a frame comprising a pair of sides journaled upon the shaft, said frame having trolley wire sustaining rollers, and means for retaining the rollers in engaging position with relation to the feed wire, means for normally sustaining the frame in a horizontal position, means for swinging the frame to bring its rollers away from each other to permit of the lowering of the trolley wheel from the feed wire and locking means adapted to be actuated by the lowering means for sustaining the support and frame from swinging upon the shaft when the device is brought to the said lowered position.

3. In combination with a spring pressed trolley pole having a harp thereon and a trolley wheel journaled upon a shaft carried by the harp, of swinging supporting means upon the shaft, a frame pivotally connected with the supporting means, angularly disposed rollers upon the frame, means for sustaining certain of said rollers in contacting position, and means for swinging the frame in an open position to permit of the wheel being lowered from the feed wire.

4. A trolley having in combination, a pole provided with a harp and an axle whose ends are in the sides of the harp, two wheels mounted at each side of the harp, a supporting member journaled upon the axle, the sides of the said member having segmental members which are adapted to be frictionally engaged by the two wheels upon each side of the harp, a frame connected with the support, said frame having feed wire encompassing rollers carried by the frame, and means for sustaining certain of said rollers in contact and prevent an outward swinging of the side members of the frame, means for swinging the said members upon the shaft to spread the rollers, and means for preventing the rotation of certain of the wheels which engage with the segmental members of the support when the actuating means for swinging the frame is operated.

5. A trolley having in combination, a spring pressed pole provided with a harp and an axle whose ends are in the sides of the harp, and a trolley wheel upon the axle adapted to be forced into contact with the feed wire by the aforementioned spring pressed pole; of a support loosely mounted upon the axle, a longitudinally arranged shaft carried by the support, a frame having rollers which are adapted to encompass the feed wire at the opposite sides of the trolley wheel, said frame comprising a pair of side members having their ends journaled on the shaft of the support, spring members connected with the sides of the frame for forcing certain of the rollers into contacting engagement, a segmental member carried by the support and having a toothed edge, a frictional wheel arranged upon the harp, and contacting with one of the edges of the segmental member, a toothed wheel also journaled upon the harp and engaging with the teeth of the segmental member, a slidable pawl normally out of engagement with the teeth of the last mentioned wheel, oval toothed intermeshing members arranged each upon one side member of the frame, an operating cable connected with one of the said members, and the said cable when actuated, adapted to engage with the pawl to force the same into engagement between the teeth of the aforementioned toothed wheel.

6. A trolley device having in combination, a spring pressed pole, an axle journaled in the harp of the pole and a trolley wheel upon the axle, a balance frame loosely arranged upon the axle, said frame including a pair of side members which are pivotally connected and which are provided with trolley wire encompassing members, and spring means between the harp and the supporting member of the frame for normally sustaining the frame in a horizontal position.

7. A trolley device having in combination a spring pressed pole, a harp for the pole, an axle upon the harp and a trolley wheel upon the axle; of a balance frame supported by the axle, said frame having sides, a shaft arranged upon the balancing member of the frame and passing through openings in the end members of the sides, angularly disposed feed wire encompassing rollers upon the end members of the frame, connecting members for the ends of the frame, disposed exteriorly and to the opposite sides of the harp, and means between the harp and the supporting member of the frame for sustaining the said frame in a normally horizontal position.

8. In combination with an ordinary spring pressed pole having a harp, an axle carried by the harp, a trolley wheel rotatably mounted upon the axle and adapted to be swung into engagement with the trolley feed wire; of a supporting member balanced upon the axle to the opposite sides of the trolley wheel, said support including angular arms and a connecting member for each pair of said arms, a longitudinally arranged shaft journaled in centrally arranged bearings in the connecting members of the support, a segmental member connected with but spaced away from the arms upon each side of the support, said member having one of its edges toothed, a frame comprising a pair of side members having inturned ends journaled upon the shaft of the support, angularly disposed feed wire encompassing rollers carried by each of the arms of the frame, spring members connecting the opposite pairs of arms of the side members of the frame to force the horizontal rollers into frictional contact, wheels pivotally secured to the sides of the harp, certain of said wheels frictionally engaging with the smooth edges of the segmental members, certain other of said wheels having peripheral teeth and engaging the toothed edges of the said segmental members, oval members having toothed intermeshing portions pivotally connected one with each of the arms of the side members of the frame at one end of the frame, a substantially U-shaped slidable member mounted in bearing sleeves upon the harp, upstanding members having their ends provided with teeth upon the side arms of the U-shaped member and arranged to engage between the teeth of the toothed wheels, springs for moving the U-shaped member to bring its teeth out of engagement with the teeth of the wheels, a pair of spaced arms upon the connecting portion of the U-shaped member, a roller journaled between the arms, a cable connected with one of the oval toothed members, and said cable adapted to pass over the last mentioned roller, substantially as and for the purpose set forth.

9. A trolley device having in combination a spring pressed pole, a harp upon the pole, an axle upon the harp and a trolley wheel upon the axle; of a support including two side members having a connecting shaft mounted upon the axle, a frame including two side members connected with the shaft of the support, spring means for normally forcing the sections of the frame toward each other, angularly disposed feed wire compensating rollers arranged upon each of the side members of the frame, and means between the harp and the support for sustaining the frame in a normally horizontal position.

In testimony whereof I affix my signature in presence of two witnesses.

WALTER EGGERS.

Witnesses:
CARROLL WALSH,
CARRIE BUSCHARDT.